US007201292B2

(12) United States Patent
Crossdale et al.

(10) Patent No.: US 7,201,292 B2
(45) Date of Patent: Apr. 10, 2007

(54) FLOW RESTRICTION DEVICE

(75) Inventors: Garry William Crossdale, Ripley (GB); Christopher John Webb, Dronfield (GB)

(73) Assignee: JohnsonDiversey, Inc., Sturtevant, WI (US)

( * ) Notice: Subject to any disclaimer, the term of this patent is extended or adjusted under 35 U.S.C. 154(b) by 420 days.

(21) Appl. No.: 10/508,267

(22) PCT Filed: Mar. 4, 2003

(86) PCT No.: PCT/US03/06538

§ 371 (c)(1),
(2), (4) Date: Sep. 17, 2004

(87) PCT Pub. No.: WO03/083332

PCT Pub. Date: Oct. 9, 2003

(65) Prior Publication Data

US 2005/0139610 A1 Jun. 30, 2005

(30) Foreign Application Priority Data

Mar. 27, 2002 (EP) ................................. 02252212

(51) Int. Cl.
*B67D 5/06* (2006.01)

(52) U.S. Cl. ................ 222/144.5; 222/132; 222/145.6; 222/145.1

(58) Field of Classification Search ............. 222/129.1, 222/132, 129.2, 135, 129.3, 136, 129.4, 137, 222/144.5, 529, 145.1, 544, 145.6, 145.7
See application file for complete search history.

(56) References Cited

U.S. PATENT DOCUMENTS

| | | | | |
|---|---|---|---|---|
| 3,625,399 | A * | 12/1971 | Heisler | 222/56 |
| 4,090,475 | A * | 5/1978 | Kwan | 222/644 |
| 4,319,698 | A * | 3/1982 | Tomiyama et al. | 222/129.1 |
| 5,344,044 | A * | 9/1994 | Hayden et al. | 222/1 |
| 5,702,032 | A | 12/1997 | Loerke | |
| 5,875,930 | A * | 3/1999 | Nakajima et al. | 222/129.1 |
| 6,322,242 | B1 * | 11/2001 | Lang et al. | 366/163.2 |

FOREIGN PATENT DOCUMENTS

| | | | |
|---|---|---|---|
| DE | 1195121 | B | 6/1965 |
| DE | 3027351 | | 2/1981 |
| EP | 0675073 | | 10/1997 |
| EP | 0997676 | | 5/2000 |
| GB | 2264109 | A | 8/1993 |
| JP | 58170982 | | 10/1983 |
| JP | 60179580 | | 9/1985 |
| NL | 7305107 | | 10/1974 |
| WO | WO95/125544 | | 5/1995 |
| WO | WO02/092208 | | 11/2002 |

* cited by examiner

*Primary Examiner*—Frederick C. Nicolas
(74) *Attorney, Agent, or Firm*—Neil E. Hamilton; James J. Sales; Renee J. Rymarz

(57) ABSTRACT

A liquid flow-restriction device has a plurality of flow-restriction passages connected to a common outlet. Each flow-restriction passage has a magnetically operable valve having a valve member movable between an open position and a closed position. The valves are operated by a common actuating element selectively positionable with respect to the valve members to open the valves. The actuating element is a permanent magnet. The device is simple and allows easy selection of a flow rate to a dilution dispenser.

14 Claims, 2 Drawing Sheets

16 8 2 11 13 9 4 7 6 12 3 5 4 9 6 12 1 7 9 8 2 4 6 14 12 3 5 7 10

FLOW RESTRICTION DEVICE

CROSS-REFERENCE TO RELATED APPLICATIONS: NONE

STATEMENT REGARDING FEDERALLY SPONSORED RESEARCH OR DEVELOPMENT: NONE

1. Field of the Invention

This invention relates to the field of liquid flow rate regulation, e.g. restriction of the flow rate of the liquid in the supply line of a chemical diluting device, such as an eductor or the like. The invention also relates to a liquid dispenser having such a flow-restriction device.

2. Background of the Invention

It is common practice in many industries, such as hotels and catering, for chemicals such as those used for cleaning to be purchased as concentrated liquids and then diluted with water to give the correct concentrations for use. Proportioning dispensing apparatus have been designed to achieve the desired dilution of the concentrated solution and dispense the mixed diluted solution.

These dispensers have commonly employed venturi-type devices, known as eductors, to aspirate or draw the concentrated solution into the water stream, see e.g. WO94/04857. In these eductors water travelling through a passage entrains the concentrated solution at a point where a restricted flow channel in the passage widens.

In order to ensure that the solution is dispensed at the desired concentration, a method of flow regulation is required to control the amount of concentrated solution drawn into the water flow. This has been achieved by means of an element having a small aperture or metering orifice in the concentrated solution feed line. This method of flow regulation has several disadvantages primarily due to the fact that it is difficult to change the flow rate of liquid to be diluted in the eductor. This is because it is difficult and time-consuming to remove the component which carries the flow restricting channel and replace it with a flow restricting component for a different flow rate. Partial dismantling of the eductor can result in spillage of the solution being diluted, so that the operator may become exposed to the potentially hazardous solution.

Our European Patent Application No. 01304253.6, published as WO02/092208, describes a flow restrictor for an eductor in the form of a cylindrical plug having four flow grooves of different sizes on its surface. The plug is inserted in a cylindrical bore so that a selected one of the grooves is in a flow path. Rotation of the plug selects a different flow rate.

WO95/12544 discloses a liquid dispenser for diluting a plurality of liquids into a main water flow into a container to be filled. An array of electronically operated valve ports is controlled to determine which liquid or liquids are fed into the main water flow, in dependence on mechanical operation of keys by a coding system on the containers which are presented to the dispenser.

SUMMARY OF THE INVENTION

An object of the present invention is to provide a liquid flow-restriction device which permits easy and quick selection of one of multiple differing flow passages, preferably not requiring electrical power and preferably offering different flow rates.

According to the invention there is provided a flow-restriction device having a plurality of flow-restriction passages connected to a common outlet, each flow-restriction passage having a flow restricting portion and a magnetically operable valve, and each valve having a valve member movable between an open position and a closed position, the valves having a common actuating element selectively positionable with respect to the respective valve members to open the valves, wherein (a) said actuating element comprises a magnet and/or (b) each of said valve members comprises a magnet. Preferably the actuating element is a permanent magnet and the valve members each comprise a body of magnetisable material.

The flow-restriction device of the invention may control flow of two or more different liquids, which are passed through different flow-restriction passages. Alternatively, in a preferred embodiment, there is a common inlet to the flow-restriction passages, in which case the flow-restriction passages preferably provide respectively different flow rates to the common outlet.

The invention also provides a liquid dispenser having a dispensing outlet for dispensing of liquid into a container and a flow-restriction device according to the invention as described above, arranged for controlling flow rate of one or more liquids to the dispensing outlet. The liquid dispenser may be of the type including dilution means, such as an eductor, for mixing a first liquid or liquids into a second liquid, such as water, in order to dilute the first liquid or liquids prior to dispensing at the dispensing outlet. The flow restriction device supplies the first liquid or liquids to the dilution means.

To obtain automatic selection of the appropriate flow rate and/or the appropriate liquid to be dispensed into a particular container, the liquid dispenser may have control means for moving the actuating element of the flow-restriction device with respect to the valve members to open a desired one of the flow-restriction passages, the control means operating in dependence on codes provided on respective containers presented to the liquid dispenser to receive liquid. The control means may be mechanical, avoiding the need for electrical power and/or relatively complex electronics.

BRIEF DESCRIPTION OF THE DRAWINGS

An embodiment of the invention will now be described by way of non-limitative example, with reference to the accompanying drawings, in which.

DESCRIPTION OF THE EMBODIMENT

Figure 1A:
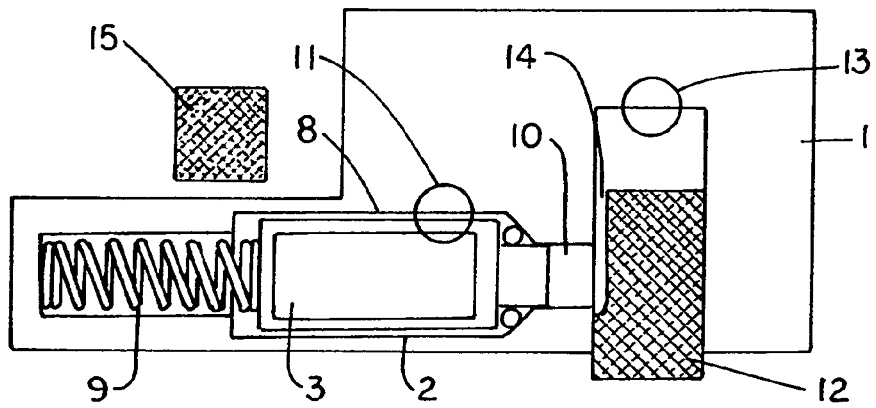
FIG. 1A is a schematic side view of a flow-restriction device embodying the invention.

The flow restriction device embodying the invention shown in the figures has a body 1 formed of moulded plastics components and having within it interconnecting cavities for receiving other components and providing liquid flow paths. Located within cavities 8 of the body are three magnetically operated valves 2, each having a valve member 3 in the form of a moulded plastics body 4 containing a body of magnetisable material 5, such as soft iron and having a projection 6 at one end surrounded by an O-ring seal 7. The valve member 3 is slidable within the cavity 8 and biased by a spring 9 into the closed position of the valve in which the O-ring 7 abuts a tapering shoulder of the cavity 8 and in which the extremity of the projection 6 is received in a passage 10 which is an outlet from the valve cavity 8.

The cavities 8 of the three valves 2 are connected to a common inlet 11 of the flow-restriction device. They are also connected, via the passages 10 and flow restrictors 12 to a common outlet 13 of the flow-restriction device. As can be seen in the figures, each flow restrictor 12 has the form of a plug having a groove 14 along its cylindrical surface. The groove 14 connects the passage 10 to the outlet 13, providing a predetermined flow resistance. The three grooves 14 are of different dimensions, so that three different flow rates are available by opening the valves 2 selectively (and further flow rates are available by opening two or more of the valves 2 selectively).

Figure 1B:
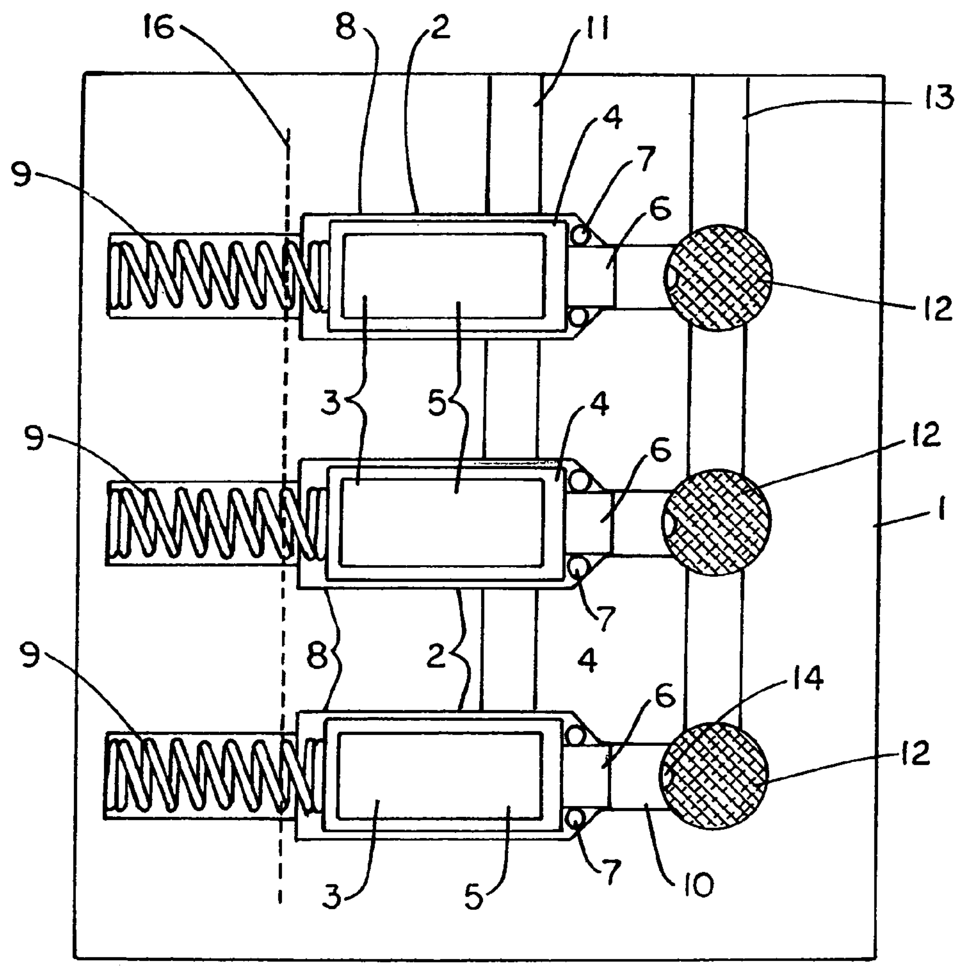
FIG. 1B is a schematic plan view of the device of FIG. 1A.
Figure 2A:
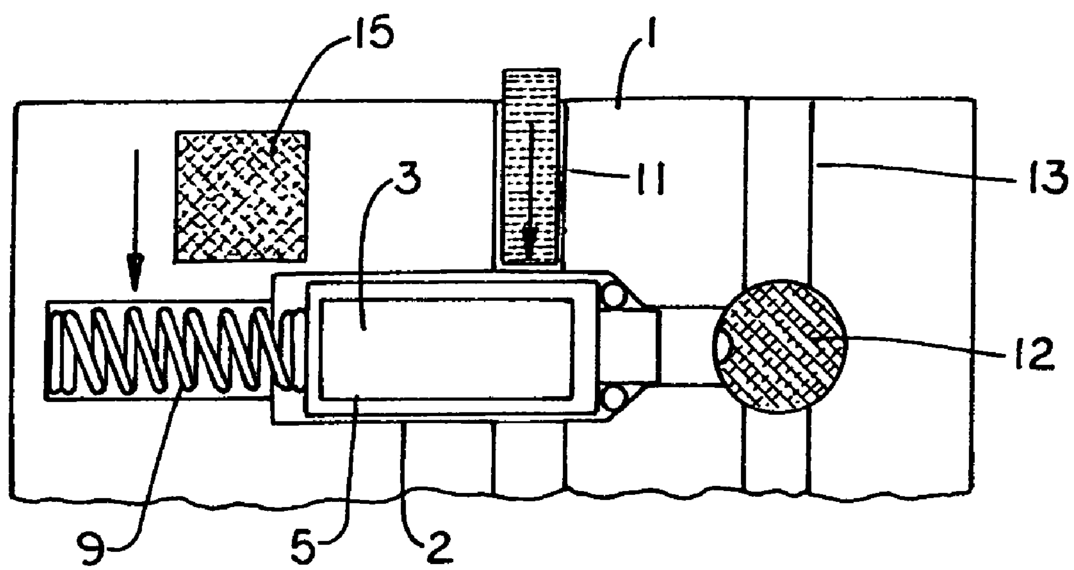
FIGS. 2A and 2B are partial plan views of the device of FIG. 1, showing one of the valves in its closed and open positions respectively.
Figure 2B:
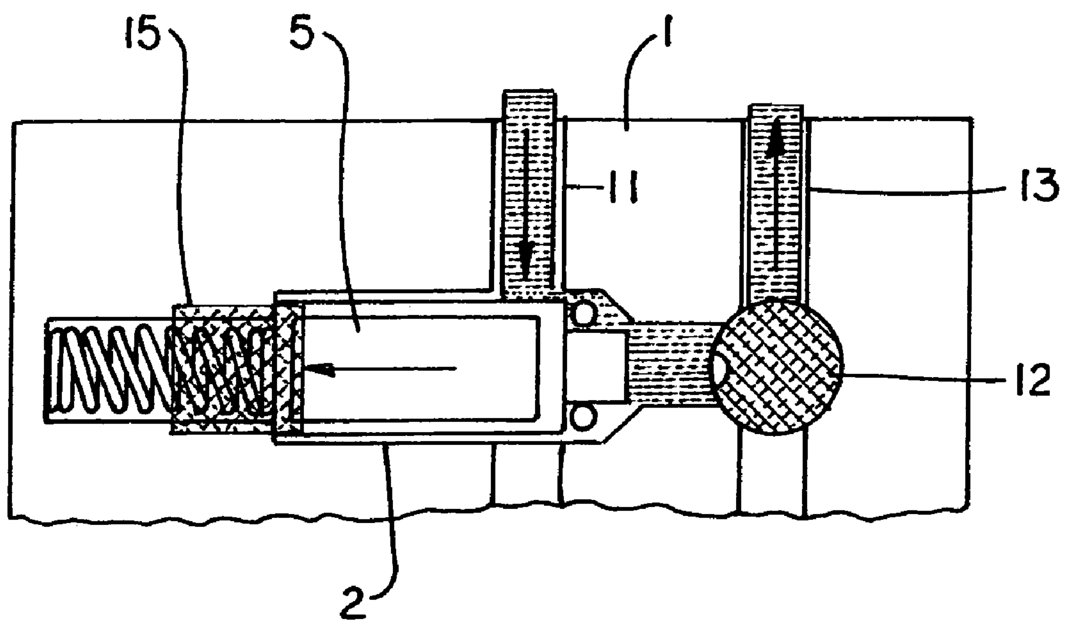

The actuating member of the flow-restriction device is a permanent magnet 15 which is arranged to be movable along a track indicated by the broken line 16 of FIG. 1B. As it moves along the track 16, the magnet 15 comes into position close to each of the three valves 2 in turn, so as to operate each valve by attracting the magnetisable body 5 so that it moves against the force of the spring 9, opening the flow path through the valve from the inlet 11 to the passage 10, as shown in FIG. 2B. The position of the magnet 15 in the closed position of the valve is shown in FIG. 2A. Movement of the magnet 15 therefore acts to select one of the valves 2 to be opened, to achieve a selected flow rate of the liquid between the inlet 11 and the outlet 13.

The magnet 15 may be replaced by magnetisable material, and the bodies 5 by permanent magnets.

The movement of the magnet 15 may be controlled manually, e.g. through a manually operated lever arrangement, or automatically, e.g. by a mechanical arrangement controlled by the operation of a liquid dispensing device. The liquid dispensing device may, for example, include an eductor of the known type described above. Automatic operation of the flow restriction device of the drawings may be achieved by controlling the movement of the magnet 15 through a suitable mechanical linkage, in dependence upon a coding on a container presented to the liquid dispensing device to be filled. The container, such as a plastics bottle, may have a coding system in the form of a key provided by a shaped portion of the container. This key may interact with an array of fingers on the dispenser which detect the key as the container is inserted to the filling position, and provide appropriate movement of the magnet 15 to open one of the valves 2, in order to achieve supply of liquid at a desired flow rate into the container.

As suggested above, the linkage between the container key and the movement of the magnet 15 may be achieved mechanically, in a simple manner. Our method of obtaining movement of a mechanical lever system from a coded container at a dispenser is shown in our European Patent Application No. 01302031.8, not yet published. Alternatively a suitable electrical or electronic arrangement may be devised. WO95/12544 and EP-A-675073 show arrangements for reading the mechanical key of plastics bottles presented to a dispenser, and such arrangements may be used in the present invention.

The flow-restriction device of the invention therefore provides a means by which one of several liquid flow paths can be selected and operated. Each of the flow paths may be fitted with different flow restrictors, allowing a selection of a particular flow rate through the device. When used in conjunction with a pump or an eductor, one of several dilution ratios for the liquid can be selected. Since the magnet requires a low operating force to move it, it is possible for the device to be easily automated, to operate in conjunction with a coding system on the containers, thus avoiding error by an operator in selecting the flow rate manually.

Though here described in conjunction with dilution devices and dispensers, the flow-restriction device of the invention is not limited to such applications, and may be applied widely where liquid flows and/or liquid flow rates require selection.

The invention claimed is:

1. A flow-restriction device having a plurality of flow-restriction passages connected to a common outlet, each said flow-restriction passage having a flow restricting portion and a magnetically operable valve, and each valve having a valve member movable between an open position and a closed position, said valves having a common actuating element selectively positionable with respect to the respective valve members to open the valves, wherein (a) said actuating element comprises a magnet and/or (b) each of said valve members comprises a magnet.

2. A flow-restriction device according to claim 1, having a common inlet to said flow-restriction passages.

3. A flow-restriction device according to claim 1, wherein said flow-restriction passages provide respectively different flow rates to said common outlet.

4. A flow-restriction device according to claim 1, wherein said actuating element is a permanent magnet and said valve members each comprise a body of magnetisable material.

5. A liquid dispenser having a dispensing outlet for dispensing of liquid into a container and a flow-restriction device according to claim 1 arranged for controlling flow rate of one or more liquids to said dispensing outlet.

6. A liquid dispenser according to claim 5, including dilution means for mixing a first liquid or liquids into a second liquid in order to dilute said first liquid or liquids prior to dispensing at said dispensing outlet, said flow-restriction device supplying said first liquid or liquids to said dilution means.

7. A liquid dispenser according to claim 5, having control means for moving said actuating element with respect to said valve members to open a desired one of said flow-restriction passages, said control means operating in dependence on codes provided on respective containers presented to the liquid dispenser to receive liquid.

8. A flow-restriction device according to claim 2, wherein said flow-restriction passages provide respectively different flow rates to said common outlet.

9. A flow-restriction device according to claim 2, wherein said actuating element is a permanent magnet and said valve members each comprise a body of magnetisable material.

10. A flow-restriction device according to claim 3, wherein said actuating element is a permanent magnet and said valve members each comprise a body of magnetisable material.

11. A liquid dispenser having a dispensing outlet for dispensing of liquid into a container and a flow-restriction device according to claim 2, arranged for controlling flow rate of one or more liquids to said dispensing outlet.

12. A liquid dispenser having a dispensing outlet for dispensing of liquid into a container and a flow-restriction device according to claim 3, arranged for controlling flow rate of one or more liquids to said dispensing outlet.

13. A liquid dispenser having a dispensing outlet for dispensing of liquid into a container and a flow-restriction device according to claim 4, arranged for controlling flow rate of one or more liquids to said dispensing outlet.

14. A liquid dispenser according to claim 6, having control means for moving said actuating element with respect to said valve members to open a desired one of said flow-restriction passages, said control means operating in dependence on codes provided on respective containers presented to the liquid dispenser to receive liquid.

* * * * *